United States Patent [19]

Mahdavi et al.

[11] Patent Number: 4,947,040
[45] Date of Patent: Aug. 7, 1990

[54] THERMAL DECAY TIME LOGGING METHOD AND TOOL

[75] Inventors: Mehrzad Mahdavi; Shivakumar Sitaraman, both of Houston, Tex.

[73] Assignee: Schlumberger Technology Corporation, Houston, Tex.

[21] Appl. No.: 455,807

[22] Filed: Dec. 20, 1989

Related U.S. Application Data

[63] Continuation of Ser. No. 380,694, Jul. 14, 1989, abandoned, which is a continuation of Ser. No. 915,301, Oct. 3, 1986, abandoned.

[51] Int. Cl.$^5$ .............................................. G01V 5/10
[52] U.S. Cl. .................................... 250/266; 250/264; 250/269
[58] Field of Search ................ 250/262, 264, 265, 266, 250/269, 270

[56] References Cited

U.S. PATENT DOCUMENTS

| | | | |
|---|---|---|---|
| 3,509,342 | 4/1970 | Dewan | 250/264 |
| 3,890,501 | 6/1975 | Johnstone | 250/270 |
| 4,302,669 | 11/1981 | Allen et al. | 250/265 |
| 4,394,574 | 7/1983 | Grau et al. | 250/269 |
| 4,424,444 | 1/1984 | Smith, Jr. et al. | 250/262 |

OTHER PUBLICATIONS

Polyachenko, ISV Geophysics, "The Theory of Nonstationary Diffussion of Thermal Neutrons in a Two-Substance Infinite Medium with a Cylindrical Dividing Surface", 1964, pp. 532–547.

Rezvanov, Izv Earth Physics, "Results of Statistical Modelling of Problems of Pulsed Neutron-Neutron Logging with Epithermal Neutrons", 1970, pp. 105–110.

S. Locke, Private Communication, "A Refined Scale Factor Measurement for TDT Sondes", Jun. 29, 1972.

Choi et al., Nuclear Geophysics, "Monte Carlo Simulation of the Temporal and Spectral Responses of the Pulsed Neutron Logging Principle", vol. 1, No. 1, pp. 71–81, 1987.

Smith, Jr. et al., SPE 7432, "Computer Simulation of Two Nuclear Well Logging Methods", Houston, Tex., Oct., 1978.

Locke et al., SPWLA Sixteenth Annual Logging Symposium, "Computed Departure Curves for the Thermal Neutron Decay Time Log", Jun. 4–7, 1975.

*Primary Examiner*—Jack I. Berman
*Attorney, Agent, or Firm*—Henry N. Garrana; Frederic C. Wagret

[57] ABSTRACT

A borehole logging method for determining the porosity of a formation surrounding the borehole, comprising the steps of: irradiating the formation surrounding the borehole from a location within the borehole with a burst of neutrons, detecting at a near detector indications of the concentration of thermal neutrons following the burst of neutrons and generating near count rate signals as a function of time in response thereto, detecting at a far detector indications of the concentration of thermal neutrons following the burst of neutrons and generating far count rate signals as a function of time in response thereto, fitting a count rate model to the near count rate signals to determine a near impulse formation count rate amplitude, fitting a count rate model to said far count rate signals to determine a far impulse formation count rate amplitude, determining the ratio of the near and far count rate signals as a characteristic proportional to the porosity of the formation.

20 Claims, 5 Drawing Sheets

THERMAL DECAY TIME LOGGING METHOD AND TOOL

This is a continuation of application Ser. No. 380,694 filed July 14, 1989, which is a continuation of application Ser. No. 915,301 filed Oct. 3, 1986, both now abandoned.

BACKGROUND OF THE INVENTION

1. Field of the Invention

This invention relates in general to nuclear logging, and in particular to a new and improved pulsed neutron logging method for determining the thermal decay time constant or tau $\tau_F$, and correlative capture cross-section $\Sigma_F$ of formations surrounding the borehole. In particular this invention relates to a method and apparatus for estimating the formation thermal decay constant, $\tau_F$, more accurately than with prior methods through the simultaneous measurement of a neutron-gamma transport parameter $\gamma_F$ of a function characteristic of the diffusion of thermal neutrons in the formation. Still more particularly this invention relates to the simultaneous measurement of formation tau; $\tau_F$, and $\gamma_F$, a characteristic of the diffusion of thermal neutrons in the formation and borehole tau; $\tau_B$; the decay constant of thermal neutrons in borehole materials; and $\gamma_B$, a characteristic of the diffusion of thermal neutrons in the borehole materials.

2. Description of the Prior Art

This invention relates to two problems in the art of pulsed neutron logging. The first involves the measurement of formation decay rate or tau, $\tau_F$ and the simultaneous measurement of borehole decay rate, $\tau_B$. The second relates to measurement of a characteristic of diffusion of thermal neutrons following a neutron burst not only in the formation, but also in the borehole. A discussion of background art is presented below first for the simultaneous measurement of $\tau_F$ and $\tau_B$ in borehole logging followed by a discussion of prior attempts to measure thermal neutron diffusion effects in pulsed neutron logging.

PRIOR ATTEMPTS TO MEASURE FORMATION THERMAL NEUTRON DECAY RATE WHERE BOREHOLE GAMMA RAYS ARE ALSO PRODUCED BY THE NEUTRON BURST

The technological history of thermal decay time or pulsed-neutron capture logging has been developed in prior patents. U.S. Pat. No. 3,379,882 to Arthur H. Youmans issued Apr. 23, 1963 outlines the physics of pulsed nuclear logging and describes the method of irradiating a formation from a borehole tool with a short burst of fast neutrons and measuring the decline rate of slow neutrons or gamma rays which result from thermal neutron capture in the formation as an indication of the identity of the nuclei of the material present in the formation.

The Youmans patent discloses that the measurement of capture gamma rays is actually more directly indicative of what has occurred in the formation after neutron bursting or pulsing than is a "slow" or thermal neutron measurement. Where a measurement is made of the entire gamma ray flux produced by the neutron pulse, the initial portion of the gamma ray population curve will depend substantially upon the gamma rays produced by the fast neutron processes, and the latter portions of the gamma ray population depends entirely upon the slow and thermal neutron processes in the formation. For that reason, as Youmans discloses, the inelastic scattering gammas are preferably distinguished from the capture gammas by initiating the detection interval only after the inelastic gammas may be expected to have substantially disappeared. In other words, the detection interval is preferably started only after the relatively short-lived inelastic scattering gamma rays may be expected to have been dissipated in the earth, and when the thermal neutron population has reached its peak.

Youmans recognized that the lifetime curve of thermal neutrons is a composite of captures occurring in borehole materials, in the porous invaded zone surrounding the borehole, and in the uninvaded formation beyond. Youmans indicated that the preferred method of making a neutron lifetime measurement, for quantitative determination of formation characteristics, is to observe the complete decline curve of the neutron induced radiation (thermal neutrons or capture gammas) from the termination of the neutron pulse to the disappearance of all induced radiation (excluding the activation or background gammas). Thereafter, it is possible to select the portion of the curve having decline characteristics most representative of the formation irradiated, which the other portions of the curve may be representative of the borehole and the borehole substances.

It is generally assumed that the thermal neutrons in the borehole will be captured early, and therefore it is the latter portion of the time cycle which is representative of the formation. However, this assumption is predicated on the requirement that the borehole be filled with substances, such as salt water, which have a thermal neutron capture cross-section greater than either oil or rock substances. If, on the other hand, the borehole is filled with fresh water, oil, or air, the neutron lifetime in the borehole may be much greater than that in the formation material, and it is the earlier portion of the curve which will be representative of the formation. Youmans suggests, then, that it may be desirable to assure that the latter portion of the curve is the portion which is representative of the formation, by the expedient of filling the borehole with salt water (or some other suitable substance) before performing the logging operation.

To restate the foregoing in simpler terms, if the borehole fluids have a higher thermal neutron capture cross-section (and a shorter correlative tau or capture time constant) than that of the formation substances, then the early portion of the curve will be representative of the borehole, and the later portion will be representative of the formation. The second two intervals will best indicate the lifetime of the thermal neutrons in the formations.

U.S. Pat. No. 3,662,179 to Frentrop and Wahl issued May 9, 1972 discloses a pulsed neutron logging system which has seen wide commercial application. Frentrop and Wahl invented a three gate system to measure formation tau, and assumed that by waiting a sufficient time after the neutron burst terminated, the borehole gamma rays induced by neutron capture have died out and that the remaining gamma rays result entirely from formation nuclei capture of thermal neutrons and natural and activation (background) gamma rays.

Frentrop and Wahl assumed that the slope of the mid-portion of the logarithmic count of gamma rays is a measure of the formation decay time, $\tau_F$. The slope or decay time is determined by sampling the count rates during the first two of the three gates. A third gate is positioned after the formation induced gamma rays have died away and is used to measure background. Background is then subtracted from the readings of Gates I and II before computing decay time. The Frentrop and Wahl system provided variable gate width times and starting locations with respect to the end of the neutron burst, yet the relationship of one to another was fixed.

Gate I starts 2T microseconds (μsec) after the end of the neutron burst. Gate I lasts T μsec; Gate II lasts 2T μsec and Gate III is positioned from 6T to 9T. Assuming an exponential decay, (i.e., $N=A_e-{t/\tau F}$), T is adjusted until the counts of the gates, $N_1$, $N_2$, $N_3$ satisfy the equation, $$2N_2 - N_1 - N_3 = 0.$$

When the equation is satisfied, adjusting T from cycle to cycle, $T = \tau_F$.

An improvement in measurement accuracy of formation decay time, $\tau_F$, is disclosed in U.S. Pat. No. 4,223,218 to Jacobson, issued on Sept. 16, 1980, U.S. Pat. No. 4,224,516 to Johnstone issued on Sept. 23, 1980, U.S. Pat. No. 4,267,447 to Johnstone issued on May 12, 1981, and U.S. Pat. No. 4,292,518 to Johnstone issued on Sept. 29, 1981. The Jacobson and Johnstone system provides sixteen (16) detection gates as distinguished from the three gate system of Frentrop and Wahl. The entire time scale of the neutron generator burst and gate opening and closings is controlled according to a characteristic time, T. But where as in the Frentrop and Wahl system the T is continuously varied to be identical to the measured value of $\tau$, the Jacobson and Johnstone system adjusts it by surface electronics in discrete steps called F-modes. The variable time - scale, or F-modes, position the gates on the decay curve to most successfully avoid the early casing and borehole signal. Gate I starts approximately $2\tau_F$ μsec from the end of the minitron burst. The purpose of the time delay between the preceding neutron burst and the beginning of the gating sequence is to permit gamma rays emanating from the immediate borehole environment, (e.g. borehole fluid, casing, cement annulus, tool housing, etc.) to die out before detection of the count rate data from the formation is commenced.

U.S. Pat. No. 4,122,338 to Smith and Pitts issued on Oct. 24, 1978 was an attempt to respond to the problem, recognized as outlined above by Youmans, that, depending on the borehole environment, the gamma ray counts measured after a fixed delay from the end of the neutron burst may include borehole events. In other words, the systems disclosed in the Frentrop and Wahl patent and in the Jacobson and Johnstone patents assume that the borehole thermal decay time, $\tau_B$, is substantially shorter than the thermal neutron decay time of the earth formation surrounding the borehole. The Smith and Pitts patent indicates that this assumption is generally correct if the borehole is filled with a drilling fluid having a high chlorine or salt water content. However, in boreholes containing air, gas, fresh water or oil base muds, the relationship of $\tau_F$ being significantly longer than $\tau_B$ may not hold. Smith and Pitts measure the actual salinity of the borehole fluids. These measurements are used to control the time delay prior to opening the first measurement gate for detecting $\tau_F$, thereby assuring that borehole gamma rays are no longer present when gamma rays are counted.

U.S. Pat. No. 3,164,720 to Armistead issued on Jan. 5, 1965 discloses a method and apparatus for logging boreholes containing air, gas, fresh water or oil e.g., boreholes having a large borehole decay constant, $\tau_B$, in comparison with the formation decay constant, $\tau_F$. Armistead specifies measuring an impulse response function in response to neutron bursts in the borehole, the decaying portion which may be expressed as a sum of two component functions exponentially decaying at different rates. These component functions are individually associated with the thermal neutron slowing down absorption and diffusion processes in the formations surrounding the borehole and in the fluid within the borehole and can be separated from each other.

U.S. Pat. No. 4,326,129 to Neufeld also discloses borehole logging operations where the impulse response function as $h(t)$ $Ae^{-\alpha t} + Be^{-\beta t}$ where A, B, $\alpha$ and $\beta$ are constants; $Ae^{-\alpha t}$ represents the neutron population of the formation component; and $Be^{-\beta t}$ represents the neutron population of the fluid component in the borehole. The constants $\alpha$ and $\beta$ represent the thermal neutron decay constants of the earth formation and of the fluid in the borehole respectively. Regardless of the relative values of $\alpha$ and $\beta$, Neufeld specifies the measurement of h(t) through a correlation or auto-correlation process, and then fits a two exponential model to the measured data to determine $\alpha$ and $\beta$ by means of a least-squares analysis.

A problem has existed in all of the prior work of pulsed neutron logging in that no method and apparatus has been suggested or devised to more precisely measure the borehole decay constant, $\tau_B$, so that where compensation of the formation decay constant is warranted, a more precise compensation and ultimate value of $\tau_F$ may be determined.

PRIOR ATTEMPTS TO MEASURE THERMAL NEUTRON DIFFUSION EFFECTS IN PULSED NEUTRON LOGGING

The discussion above has described prior inventors' quest for a technological solution to separating the borehole signals from the formation signal so as to obtain accurate quantitative decay rate information about the formation. Another problem of pulsed neutron logging has been the subject of investigation: the effect of neutron diffusion on the measurement of the neutron decay constant of the formation.

As indicated above, a prior art technique for measuring the rate of decay of thermal neutrons following a pulse of fast neutrons is to take the ratio of gamma ray counts at two different times after a delay from the end of the neutron pulse. The mathematical model for the decay of the thermal neutrons as measured by the number of gamma rays detected is taken as a simple exponential $$N(t) = N_o e^{-\Sigma_F v t} \qquad (1)$$

or $$N(t) = N_o e^{-t/\tau_F} \qquad (2)$$

where
  $\Sigma_F$ is the capture cross-section of the formation,
  v is the mean thermal velocity of the neutron travel in the formation,
  t is the elapsed time after a given delay from the end of the neutron burst, and $$\tau_F = \frac{1}{\Sigma_F v}$$

is called the lifetime or decay time constant of the formation.

Equations (1) and (2) are correct for a beam of neutrons traveling through an absorber. They are also correct in an infinite medium, although not correct for multi-region systems. But it is known that neutrons diffuse rather than travel in a beam. The time dependent version of neutron diffusion following a burst of fast neutrons is $$\frac{1}{v} \frac{d\Phi}{dt} = -D\nabla^2\Phi + \Sigma_a\Phi \tag{3}$$

where $\Phi$ is the thermal neutron flux—the product of the number of thermal neutrons per cubic centimeter and their mean thermal velocity (neutron/square centimeter/second)—and $\Sigma_a$ is the capture cross-section of the absorber.

Since $\Phi = vN$, where N is the number of thermal neutrons present at any time, equation (3) can be written, $$\frac{dN(r,t)}{dt} = -D'\nabla^2 N + \Sigma_a v N \tag{4}$$

Equation (2) is only satisfied if $\nabla^2 N = 0$, that is diffusion doesn't exist, or is ignored.

A diffusion time $t_d$ has been used to describe the effect of diffusion, $$\frac{1}{t_d} = \frac{D'\nabla^2 N}{N} \tag{5}$$

where D' is proportional to the slowing-down length $L_s$ and is therefore a function of medium properties such as the hydrogen index $I_H$ and the water content of the formation. A description of this approach to the diffusion problem is described in a publication by Wahl, J. S., W. B. Nelligan, A. H. Frentrop, C. W. Johnstone, and R. J. Schwartz: "The Thermal Neutron Decay Time Log," *Soc. Petr. Eng. J.*, vol. 19, 1970, p. 365.

Another approach has been to consider the effect of diffusion for a cylindrical geometry with a "black" borehole one with a lifetime in the hole equal to zero. This approach assumes that $$N(r,t) = e^{-\lambda t}$$

where $$\lambda = \frac{1}{\tau_F} + \Delta \tag{6}$$

and $\Delta$ is a function of the formation properties, especially $L_s$, the neutron slowing down length. Such an approach is described in a publication by Polyachenko, A. L., T. E. Gavrina, V. G. Tseitlin, and T. A. Shaposhnikova, "Analysis of Amplitude, Time, and Space Characteristics of the Gamma-Quanta Distribution in Pulsed Neutron-Gamma Logging," *Yadernaya Geofiz*, vol. 7, 1969, p. 40. VCRL-Trans-10597.

The approaches described above have not adequately solved the diffusion problem in pulsed neutron logging.

IDENTIFICATION OF OBJECTS OF THE INVENTION

A primary object of this invention is to provide an apparatus and method for accurately measuring the decay rate $\tau_F$, of thermal neutrons in the formations surrounding a borehole by simultaneously determining a neutron-gamma transport parameter, $\gamma_F$, of a function characteristic of the diffusion of thermal neutrons in the formation.

Another object of this invention is to not only measure the neutron-gamma transport parameter, $\gamma_F$, and thermal decay rate $\tau_F$ of the formation surrounding the borehole, but also to simultaneously measure the decay rate of thermal neutrons of the borehole materials, $\tau_B$ and a neutron-gamma transport parameter, $\gamma_B$, of a function characteristic of the diffusion of thermal neutrons in the borehole materials.

Another object of this invention is to measure the impulse amplitudes associated with borehole and formation components.

Still another object of the invention is to provide a pulsed neutron and measurement regime including alternating short and long neutron bursts each followed by gamma ray count rate measurements and fitting techniques for measuring the decay rate of captured thermal neutrons in the formation, $\tau_F$, a neutron-gamma transport parameter in the formation, $\gamma_F$, the decay rate of thermal neutrons borehole materials, $\tau_B$, and a neutron-gamma transport parameter in the borehole materials $\gamma_B$.

SUMMARY OF THE INVENTION

The objects identified above, as well as other advantages and features of the invention are achieved, according to the invention by fitting a novel model to measured count rate decay curves which result from neutron bursts in the borehole. Assuming that the borehole effects have died out, the measured time dependent count rate N(t) at a given source-detector spacing is fit to a model, $$N(t) = A_f F(t) e^{-t/\tau_f} \tag{7a}$$

where F(t) is a monotonically decreasing function of time. This can be approximated in the infinite medium to be, $$N(t) = A_f t^{-\gamma_F} e^{-t/\gamma_f} \tag{7b}$$

where the neutron burst as a function of time S(t) is assumed to be a delta or "impulse" function.

Where the neutron burst intensity is an arbitrary function of time, S(t), and assuming that the count rate curve N(t) is delayed a sufficient length of time for borehole effects to have died out, the measured count rate curve is fit to a model, $$N(t) = A_F [\int_{t'} (t-t')^{-\gamma_F} S(t') e^{t'/\gamma_F} dt'] e^{-t/\gamma_F}. \tag{8}$$

Taking account of the borehole effects, that is measuring N(t) such that a portion of borehole induced gamma ray effects due to thermal neutron decay are included in the measured signal, the measured count rate curve N(t) is fit to a model, $$N(t) = F(t) e^{-t/\gamma_F} + H(t) e^{-t/\gamma_B}. \tag{9a}$$

preferably, $$N(t) = A_B t^{-\gamma_B} e^{-t/\tau_B} + A_F t^{-\gamma_F} e^{-t/\tau_F}, \quad (9b)$$

where the neutron burst is assumed to be a delta function, and $$N(t) = A_B [\int_{t'} (t - t')^{-\gamma_B} S(t') e^{t'/\tau_B} dt'] e^{-t/\tau_B} + \quad (10)$$
$$A_F [\int_{t'} (t - t')^{-\gamma_F} S(t') e^{t'/\tau_F} dt'] e^{-t/\tau_F},$$

where the neutron burst is an arbitrary function of time.

According to a preferred embodiment of the invention, equation (10) is used as a model to fit to gamma ray count rate data following an alternating short burst, short delay—long burst, long delay neutron bursting-/measurement regime.

According to another feature of the invention, it has been discovered that a porosity measurement of the formation may be achieved by ratioing $A_{Fn}$ to $A_{Ff}$ where $A_{Fn}$ and $A_{Ff}$ are impulse formation count rate amplitudes measured from a near and far detector. It has also been discovered that the neutron gamma diffusion transport parameter $\gamma_F$ may be used to estimate porosity of the formation.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

This invention relates to a novel and improved fast neutron bursting and measurement method which considers formation and borehole thermal neutron capture induced gamma rays which diffuse respectively in the formation and in the borehole materials. The apparatus needed to accomplish the method is similar in many respects to that disclosed in U.S. Pat. No. 4,223,218 issued to Jacobson on Sept. 16, 1980 and assigned to Schlumberger Technology Corporation as is the invention described here. That patent is incorporated by reference to this specification. For an overall description of the tool, telemetry and surface instrumentation, the introductory portion of U.S. Pat. No. 4,223,218 is repeated below, before turning to the bursting and detection schedules and the models and method for extracting borehole tau, $\tau_B$, a borehole neutron gamma transport parameter $\gamma_B$, formation tau, $\gamma_F$, a formation neutron - gamma transport parameter $\gamma_F$, a borehole impulse amplitude $A_B$, and a formation impulse amplitude $A_F$.

Figure 1:
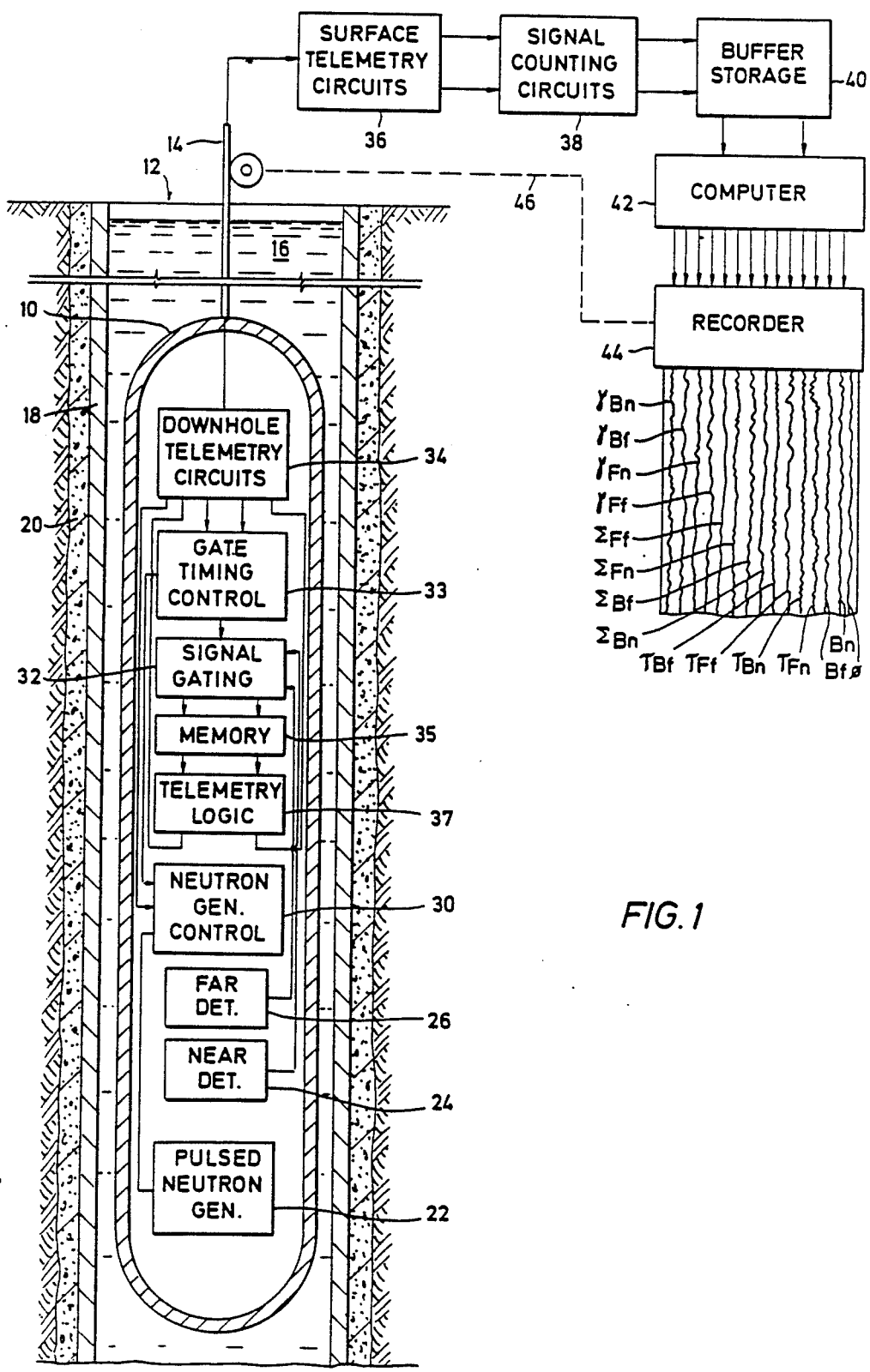
FIG. 1 is a schematic view of a thermal neutron decay downhole tool and associated surface instrumentation.

FIG. 1 shows a well logging tool constructed in accordance with the invention and includes a fluid-tight, pressure-and-temperature resistant sonde or tool 10 that is adapted to be suspended in and moved through a well bore 12 by an armored cable 14. The well bore 12 is illustrated as containing a borehole fluid 16 and as including a steel casing 18 and surrounding cement annulus 20. Although no tubing is shown in the borehole, the tool 10 may if desired be sized for through-tubing use.

The downhole tool 10 includes a pulsed neutron generator 22 and two radiation detectors 24 and 26 that are located at different spacings from the neutron generator 22. The detector 24 spaced closest to the neutron generator is designated the "near" detector and the detector 26 located farther from the neutron source is designated the "far" detector. For the purpose of the present invention, the neutron generator 22 is preferably of the type which generates discrete pulses of fast neutrons, e.g. 14 Mev., and may for example be of the types described in more complete detail in U.S. Pat. No. 2,991,364 to C. Goodman, dated July 4, 1961, and U.S. Pat. No. 3,546,512 to A. H. Frentrop, dated Dec. 8, 1970. Operation of the neutron generator 22 is controlled in part by a neutron generator control circuit 30, and this circuit may also be of the types described in the aforementioned patents. The detectors 24 and 26 may be of any construction suitable for the detection of the thermal neutron concentrations in the surrounding earth formation and, to that end, may be of the thermal neutron sensitive type, e.g. helium 3 filled proportional counters, or of the gamma ray sensitive type, such as thallium-activated sodium iodide detectors. In the preferred embodiment, the detectors 24 and 26 preferably comprise sodium iodide scintillation detectors and, in this respect, will be understood to include the usual photomultiplier tubes, photomuliplier high voltage supplies, and amplifier-discriminators (not shown). It will also be understood that other downhole power sources (not shown) are provided as required to drive the neutron generator 22 and other downhole circuits. Power for the well tool 10 is supplied over the cable 14 from a surface power supply (not shown), as is conventional. Output pulses from the near detector 24 and the far detector 26, representative of the concentration of thermal neutrons in the irradiated formation, are applied to signal gating circuits 32. The signal gating circuits 32 are controlled by gate timing circuits 33, which also control the operation of the neutron generator control circuit 30. From the signal gating circuits 32 the detector signals are counted and stored in memory circuits 35 and thence, under control of telemetry logic circuits 37, are applied to downhole telemetry circuits 34 for transmission to the surface over the cable 14. The overal design of the neutron generator control circuit 30, the signal gating circuits 32, the gate timing circuits 33, the memory circuits 35, and the telemetry circuits 34 is similar to that described in the above mentioned U.S. Pat. No. 4,223,218, but are not described here for the sake of brevity. The circuits are designed to achieve the timing schedules for bursting and detection according to that illustrated in FIG. 2 which is discussed in detail below. The downhole telemetry circuits 34 may be of any known construction for encoding, time division multiplexing, or otherwise preparing the data-bearing signals applied to them from the telemetry logic circuits 37 and for impressing such data on the cable 14. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and transmission, respectively, of command messages from the surface. Suitably, the circuits 34 and 36 comprise a bi-directional data telemetry system useful for these purposes and having a 10K bit per second upward data rate.

Following surface telemetry circuits 36 the near-detector and far-detector signals are separately counted in signal counting circuits 38 to acquire the thermal neutron decay curve data over a desired accumulation interval $\Delta t$. Upon termination of the data accumulation time $\Delta t$, which may be selected, for example, to correspond to a desired interval of depth in accordance with logging speed of the tool, the count rate data accumulated in the signal counting circuits 38 and transferred to buffers 40 and the signal counting circuits 38 are reset to zero.

From storage 40, the count rate data are processed in a computer 42, which suitably comprises a microprocessor or, alternatively, a general purpose digital computer such as that manufactured by Digital Equipment Corporation, Maynard, Mass., under the designation PDP-11. As is described more fully hereinafter, the computer 42 processes the count rate data from the respective detectors to develop various desired outputs, including, for example, the decay time constants of the bore hole and formation as measured with the near detector, $\tau_{Bn}$ and $\tau_{Fn}$, and the decay time constants of the borehole and formation as measured with the far detector, $\tau_{Bn}$ and $\tau_{Fn}$, the corresponding macroscopic capture cross-sections $\Sigma_{Bn}$, $\Sigma_{Bf}$, $\Sigma_{Fn}$ and $\Sigma_{Ff}$, and various other selected outputs such as background counting rating $B_n$ and $B_f$, from the respective detectors.

All of these outputs may be recorded in conventional fashion as a function of tool depth in a recorder 44. The usual cable-following mechanical linkage, indicated diagrammatically at 46 in FIG. 1, is provided for this purpose.

Figure 2:
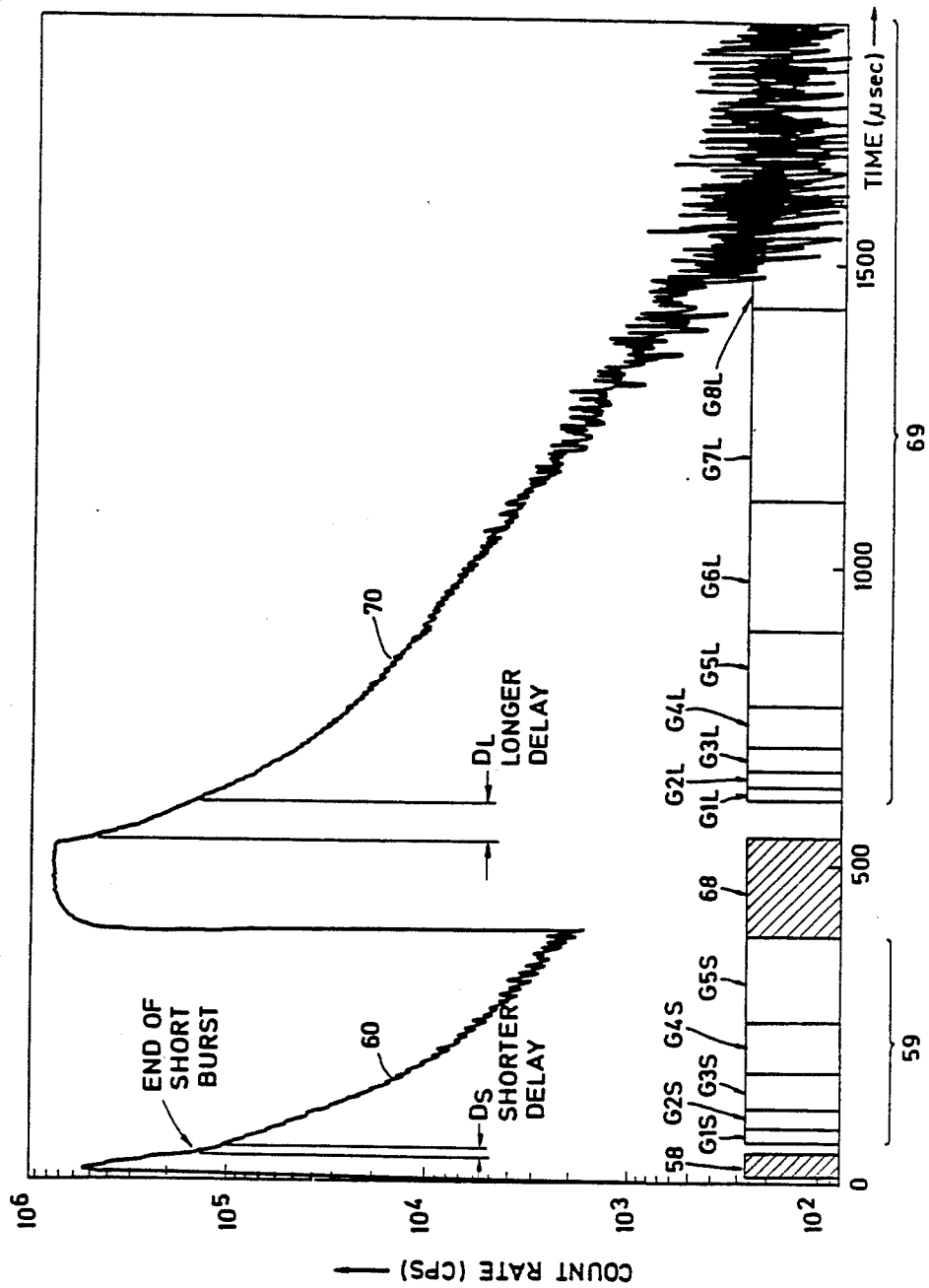
FIG. 2 is a graphical representation of logarithmic count rate plotted as a function of time and showing bursting schedules, gating schedules and logarithmic count rates which result from the neutron bursts.

FIG. 2 illustrates the fast neutron bursting schedule and the counting gates following each neutron burst. Curves 60 and 70 represent, respectively the variation with time of the logarithmic counting rate of thermal neutron capture gamma rays following irradiation first with the short burst 58 of fast neutrons and the long burst 68 of fast neutrons.

Preferably the time length of the long burst 68 and the time length of the short burst 58 are fixed lengths: the short burst 58 is 20 $\mu$sec; the long burst is 160 $\mu$sec. A series 59 of first counting gates, namely five counting gates, $G_{1S}$-$G_{5S}$, are provided following a "shorter" delay $D_S$ after the short burst 58. A series 69 of second counting gates, namely eight counting gates, $G_{1L}$-$G_{8L}$ are provided following a "longer" delay $D_L$ after the long burst 68. The long burst 68 follows immediately after the last gate $G_{5S}$ of the series 59 of first counting gates. Table I below presents the timing sequence for the bursting, delays and counting gates of the preferred embodiment of the invention. Similar sets of timing gates are used for both the near and far gamma ray detectors.

TABLE I

| Item | BEGIN TIME ($\mu$sec) | DURATION ($\mu$sec) |
|---|---|---|
| Short Burst 58 | 0 | 20 |
| Short Delay $D_S$ | 20 | 18 |
| Gate $G_{1S}$ | 38 | 22 |
| Gate $G_{2S}$ | 60 | 28 |
| Gate $G_{3S}$ | 88 | 50 |
| Gate $G_{4S}$ | 138 | 97 |
| Gate $G_{5S}$ | 235 | 153 |
| Long Burst 68 | 388 | 150 |
| Long Delay $D_L$ | 548 | 60 |
| Gate $G_{1L}$ | 608 | 14 |
| Gate $G_{2L}$ | 622 | 18 |
| Gate $G_{3L}$ | 640 | 40 |
| Gate $G_{4L}$ | 680 | 76 |
| Gate $G_{5L}$ | 756 | 125 |
| Gate $G_{6L}$ | 881 | 210 |
| Gate $G_{7L}$ | 1091 | 340 |
| Gate $G_{8L}$ | 1431 | 449 |
| Cycle Time | 1880 $\mu$sec | |

After 128 cycles of the dual burst timing scheme there is a delay of 3msec (not illustrated) after which a background gate of 15msec is provided to measure the activation count rate of the corresponding detector. The corresponding background count rate is thus determined for the near detector 24 and the far detector 26. These two background count rates may be recorded on the log recorder 44 and used in the estimate of borehole decay rate, $\tau_B$, and formation decay rate, $\tau_F$, as explained below.

Ideally, to obtain the optimum decay curve from which to calculate both decay constants, the neutron burst should be as short as possible. However a neutron generator or "MINITRON" as described in U.S. Pat. Nos. 2,991,364 and 3,546,512 referenced above cannot operate at its maximum output when driven at short bursts at a low repetition rate, i.e., duty factors less than 5%. The count rate of gamma rays detected a relatively long time from the end of a short burst, which contains mainly the information of the thermal neutron decay in the formation, will be very low and highly affected by background counts. Its measurement would be statistically inaccurate.

However, if the burst is made longer in time in order to increase the minitron output, the precision of the formation tau determination improves, but the count rate increases greatly in the time immediately following the burst. This extremely high count rate requires a large, and consequently unreliable, dead time correction in the signal counting circuits 38 of FIG. 1. Such dead time occurs where gamma rays are impinging upon detectors 22 and 24 in great numbers, some of which are occurring essentially at precisely the same time. Dead time corrections are made as a function of total counts on the basis that the more counts per unit time measured, the greater the probability that a certain number of the detected gamma rays occurred at precisely the same time.

Thus, the short burst 58 long burst 68 regime depicted in FIG. 2 according to the invention results in the following advantages.

Figure 4:
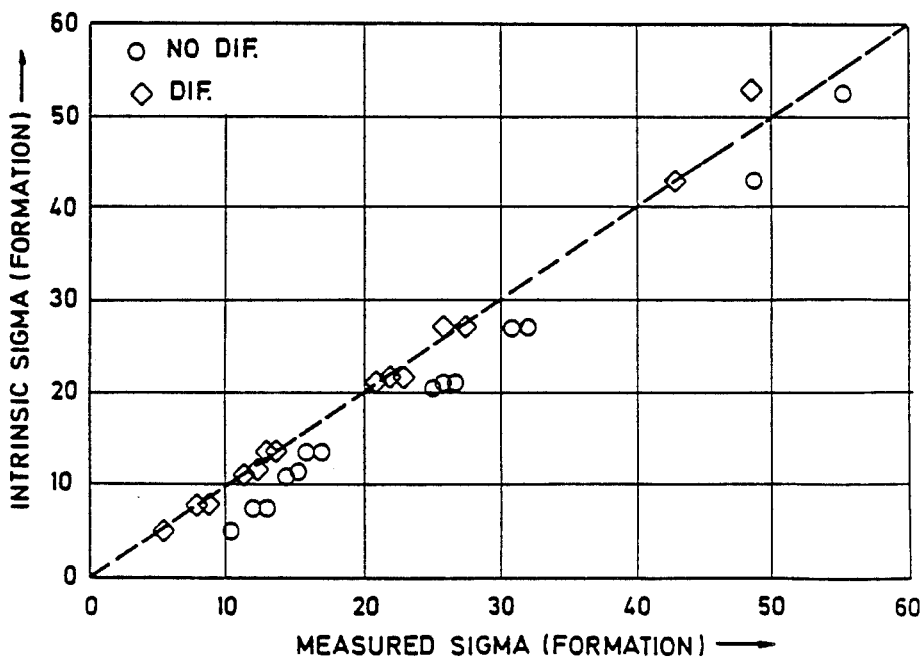
FIG. 4 is a graphical representation of actual formation sigma versus measured formation sigma, for various formation sigmas, and comparing a two exponential model of formation and borehole taus with a novel model which not only assumes formation and borehole gamma-rays in the measured count rate data, but also accounts for diffusion effects in the formation and in the borehole.

The short burst-long burst regime of FIG. 4 results in a high duty factor (approximately 9%) for the neutron generator. A high duty factor allows the neutron generator to be operated at its maximum output. Thus a short burst may be provided in the bursting/detection regime while simultaneously providing for the neutron generator to be running at its maximum output.

Dual time length bursting of the borehole materials and the formation results in a reduction of the total number of detected gamma rays resulting for absorption of thermal neutrons after the short burst. As indicated above, the borehole materials component predominates in the total signal following the short burst. A reduction of total gamma rays detected in the time following the narrow burst 58 requires only small dead time corrections using practical amplifier/discriminator circuitry in counting circuits 38. Better statistical accuracy of the estimate of the number of gamma rays resulting from the borehole materials is achieved. In a nutshell, a "good" borehole signal is obtained following the short burst.

The total gamma ray count rate resulting from thermal neutron absorption following the long burst is extremely high immediately after the long burst ends. Such a high count rate immediately after the long burst is due to the fact that borehole materials have been "charged-up" to near their saturation level. However a relatively longer delay $D_L$ is provided after the long neutron burst 68 so that the total count rate due to both the formation component and the borehole materials component has decayed to a level where large dead time corrections in the counting circuitry 38 may be avoided. During the delay $D_L$, the faster decaying borehole materials decreases sufficiently such that the measured count rate signals measured in the later counting gates are predominately from the formation. In a nutshell, a "good" formation signal is obtained following the long burst.

A typical decay curve from the short and long bursts is demonstrated in FIG. 2. The decay curve data, if modeled with a summed two exponential function of the form, $$N(t) = A_B e^{-t/\tau_B} + A_F e^{-t/\tau_F} \tag{11}$$

will yield a numerical value for $$\tau_F = \frac{4545}{\Sigma_F} = \text{decay rate of thermal neutrons in the formation}$$

$$\tau_B = \frac{4545}{\Sigma_B} = \text{decay rate of thermal neutrons in the borehole materials,}$$

where
$\Sigma_F$ = capture cross-section of the formation
$\Sigma_B$ = capture cross-section of the borehole
$A_B$, $A_F$ = Borehole and Formation count rate signals.

The model of equation (11) assumes that time t is measured from the end of the burst.

Figure 3:
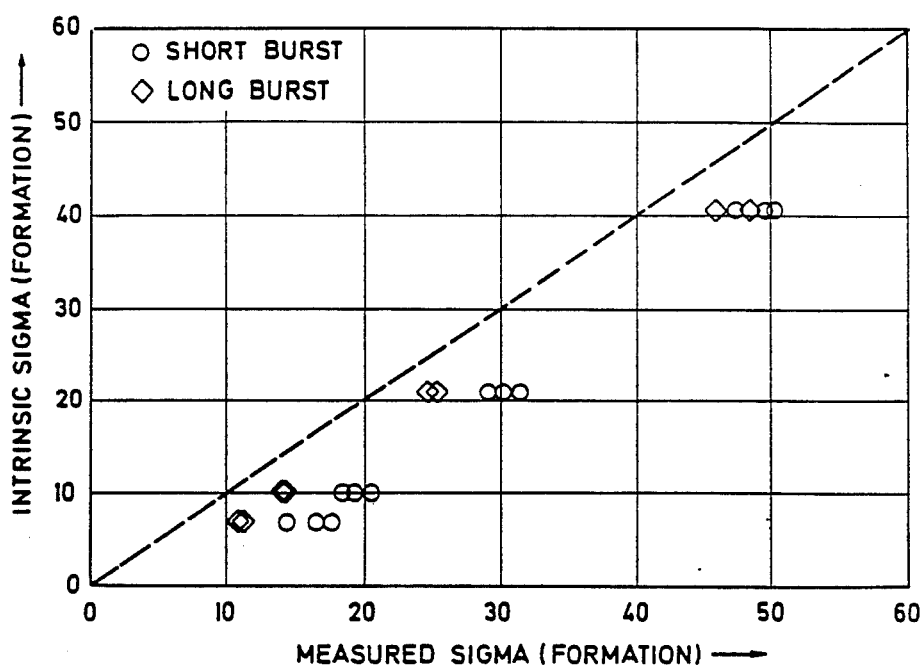
FIG. 3 is a graphical representation of actual or "intrinsic" formation sigma versus measured formation sigma, for various formation sigmas where a two exponential model of formation and borehole taus is fit first to a measured decay count rate curve following a short burst of fast neutrons and second to a measured decay count rate curve following a long burst of fast neutrons.

However, where the model of equation (11) is fit to actual count rate data, like those of FIG. 2, for formations of known capture cross-section, a clear difference exists between the measured capture cross-section of the formation and the known or intrinsic capture cross-section of the formation. FIG. 3 demonstrates the difference where the measured sigma of the formation is determined by fitting equation (11) to the short burst data 60 and the long burst data 70 of FIG. 2 for various levels of intrinsic formation sigmas. Fitting is accomplished by fitting $A_B$, $\tau_B$, $A_F$, and $\tau_F$ of the model of equation (11) to the decay curves following the short burst 60 and the long burst 70 using conventional least squares fitting methods. FIG. 3 shows that the short burst fit produces measured formation sigmas significantly greater than actual or intrinsic sigmas, and even for the long burst fits, measured formation sigmas are somewhat greater than intrinsic sigmas. The measured formation decay rate, inversely proportional to formation sigma, is consequently lower than actual formation decay rate.

It has been discovered that the cause for the measurement inaccuracy as indicated in FIG. 3, is the diffusion effect of the thermal neutrons, not only in the formation, but also in the borehole materials. The diffusion effect is significant in the measured formation capture cross-section in the range of interest for thermal decay time tools.

A more accurate model of the decay of thermal neutrons in the formation and in the borehole materials can be determined by solving the time dependent neutron diffusion equation, similar to equation (3) described above, and explicitly including the forcing function of a burst of fast neutrons which slow down to thermal energy.

The time dependent transport of thermal neutrons in the borehole and surrounding formation can be described by the neutron diffusion equation, $$\frac{1}{v} \frac{\partial \phi(\vec{r},t)}{\partial t} - D\nabla^2 \phi(\vec{r},t) + \Sigma_a \phi(\vec{r},t) = S(\vec{r},t) \tag{12}$$

where,
$\phi$ = neutron flux;
D = thermal diffusion coefficient;
$\Sigma_a$ = macroscopic absorption cross-section of the medium;
v = speed of thermal neutrons;
$S(\vec{r},t)$ = source of thermal neutrons.

The infinite medium solution to the above equation for a delta neutron burst in time and a point in space is given by, $$\phi(\vec{r},t) = \frac{vS_0}{(4\pi vDt)^{3/2}} e^{-v\Sigma_a t} e^{-|\vec{r}|^2/4vDt} \tag{12A}$$

In the case of capture gamma ray measurements, the detector signal is given by, $$N(\vec{r}_0,t) = \Sigma_a \int d^3r \phi(\vec{r},t) G(\vec{r},\vec{r}_0) \tag{12B}$$

where $r_0$ is the position of the detector and $G(\vec{r},\vec{r}_0)$ is the transport function for capture gamma rays originating at a point $\vec{r}$.

Assuming that $\phi$ is a function of r and t, the solution to equation (12) is a time and space dependent distribution of thermal neutrons. Since the source to detector spacing is fixed, the time dependent detector signal can be shown to be, $$N(t) = A_B F(t) e^{-t/\tau_B} + A_F H(t) e^{-t/\tau_F} \tag{13}$$

where $A_B$, $A_F$ are impulse borehole and formation count rate amplitudes, and F(t) and H(t) are time dependent functions describing the diffusion effect.

These functions [(F(t) and H(t))] are non-exponential, generally monotonically decreasing diffusion functions of time which approximate zero value at very long times.

For a "delta" or "impulse" function burst of fast neutrons and for an infinite medium, equation (13) can be approximated as $$N(t) = A_B t^{-\gamma_B} e^{-t/\tau_B} + A_F t^{-\gamma_F} e^{-t/\tau_F} \tag{14}$$

where $\gamma_B$, $\gamma_F$ are neutron—gamma ray transport parameters.

A "delta" or "impulse" function is zero everywhere except at t=o; at this point it is infinite. The area under the impulse is unity (1).

Where the neutron burst cannot be adequately modeled as an impulse, but rather is an arbitrary function of time S(t), equation (13) may be written as, $$N(t) = A_B [\int t'(t-t')^{-\gamma_B} S(t') e^{t'/\tau_B} dt'] e^{-t/\tau_B} \\ + A_F [\int t'(t-t')^{-\gamma_F} S(t') e^{t'/\tau_F} dt'] e^{-t/\tau_F}. \tag{16}$$

Figure 5:
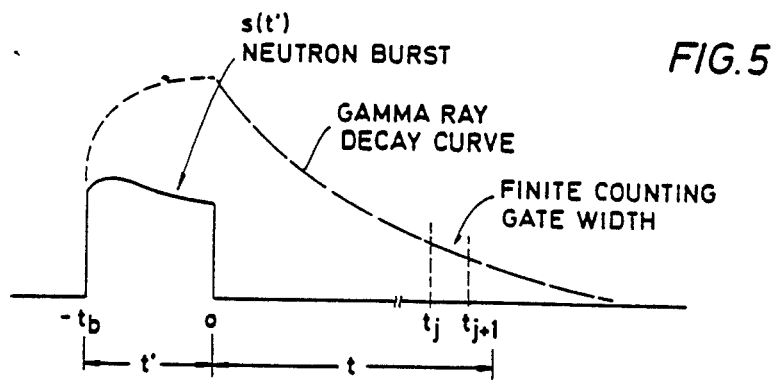
FIG. 5 is a schematic illustration showing an arbitrarly shaped neutron burst function; counting gates of finite width and the definition of time variables over counting gates and the neutron burst.

In equation 16, the variable t' is a variable over the burst width and t is measured from the end of the burst. FIG. 5 is an illustration of the neutron burst S(t'), and a gamma ray decay curve and the definition of t and t'. In the case of finite width counting gates, for example, the gate illustrated between times $t_j$ and $t_{j+1}$, equation 16 may be integrated over the gate width, $$N_{j,j+1} = A_B \int_{t_j}^{t_{j+1}} dt \int_{-t_b}^{0} dt'(t-t')^{-\gamma_B} S(t') e^{-(t-t')/\tau_F} + \\ A_F \int_{t_j}^{t_{j+1}} dt \int_{-t_b}^{0} dt'(t-t')^{-\gamma_B} S(t') e^{-(t-t')/\tau_B}. \tag{16A}$$

Where a rectangularly shaped pulse or burst of fast neutrons is used to irradiate the surrounding formation, the count rate signal following the end of the square wave burst can be approximated by a model of the form, $$N(t) = A'_B t^{-\gamma_B} e^{-t/\tau_B} + A'_F t^{-\tau_F} e^{-t/\tau_F}, \tag{17}$$

similar to that of equation 14, where t may be measured, for example, from the center of the rectangular burst.

Where the borehole $\tau_B$ is very short as compared to $\tau_F$, equation (16) may be used by ignoring the borehole terms and fitting merely the formation terms to the count rate data after a suitable delay $D_L$ as illustrated in FIG. 2. A single long burst such as burst 68 of FIG. 2 may be used. The fitting model which results from equation 16 as $$A_F [\int t'(t-t')^{-\gamma_F} S(t') e^{t'/\tau_F} dt'] e^{-t/\tau_F}, \tag{18}$$

where S(t') is an arbitrary function of time.

If the rectangularly shaped pulse approximation is made, ignoring the borehole components from equation 17 results in the fitting model, $$N(t) = A'_F t^{-\gamma_F} e^{-t/\tau_F}. \tag{19}$$

Where the borehole $\tau_B$ cannot be ignored, equation (16) may be fit to the count rate data following a single long burst. However, it is advantageous to provide the long burst, short burst sequence of burst-detection intervals as illustrated in FIG. 2 and use equation (16) as the fitting model for the count rate data following the long burst and again for the count rate data following the short burst.

An iterative method of determining $\tau_F$, $\tau_B$, $\gamma_F$, $\gamma_B$, $A_B$ and $A_F$ may be used similar to that described in corresponding U.S. patent application Ser. No. 825,182 filed Jan. 31, 1986 of Peter D. Wraight and assigned to Schlumberger Technology Corporation which is incorporated herein. Also, the parameters $\tau_F$, $\tau_B$, $\gamma_F$, $\gamma_B$, $A_B$ and $A_F$ may be determined by least squares fitting techniques where the model of equation (16) applies to count rate data following the short burst and to the count rate data following the long burst. The constants, $A_B$ and $A_F$ are the impulse amplitudes of equation 16. The constants $A_B$ and $A_F$ of the short and long bursts are independent of the burst width. Therefore $A_B$ amplitudes following long and short bursts are equal, as are $A_F$ amplitudes following long and short bursts.

The neutron—gamma ray transport parameters $\gamma_B$, $\gamma_F$, may be evaluated at the same time as the decay rate parameters $\tau_B$, $\tau_F$ and impulse amplitudes $A_B$ and $A_F$ by fitting the model, for example that of equation (16), to a detected decay curve. FIG. 4 illustrates that the use of the model represented by equation (16) to the count rate data like that of FIG. 2 results in the determination of measured sigma (or equivalently, $\tau_F = 4545/\Sigma_F$) with increased accuracy over that where the model of equation (11) without a diffusion term is used.

Figure 6:
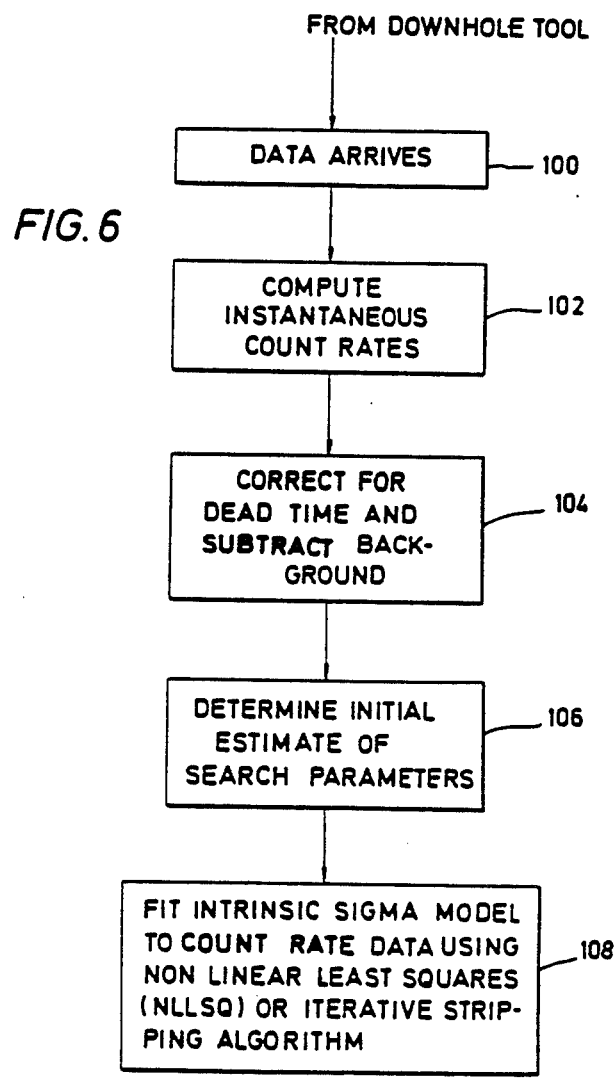
FIG. 6 is a flow diagram illustrating the preferred fitting techniques by which count rate data is applied to the novel model including diffusion effects.

FIG. 6 is a flow diagram illustrative of the steps by which count rate data is preferably processed to determine characteristics of the borehole materials and of the earth formation surrounding the borehole. Raw data signals are transmitted from the downhole tool 10 via cable 14 and arrive at the signal counting circuits 38 via surface telemetry circuits 36 (see FIG. 1). This step is represented by box 100 of FIG. 5. The instantaneous count rates are computed from the raw data in computer 42 as represented by box 102.

Next, as indicated by box 104, the computer, under program control, corrects for dead time and subtracts background signals. Dead time corrections are accomplished by applying a dead time model obtained from laboratory measurements which characterize the detector (24 or 26) and amplifier/discriminator as a function of count rate and temperature. Background subtraction is achieved using the background level obtained from the background gate described previously. With a dual burst schedule like that of FIG. 2, background gamma counts are obtained for approximately fourteen (14) msec every one-quarter (¼) second.

As indicated by box 106, initial estimates are necessary for the search parameters used in the Non Linear Least Squares (NLLSQ) method by which the "intrinsic sigma model" as represented by equations 16, 17, 18 or 19 is fit to the corrected count rate data. Initial estimates for the NLLSQ program may be provided from the previous determination of parameters from the immediately preceding logging depth. Alternatively at each depth, a simple linear fit to the data may be performed. For example, a linear least squares fit to the logarithm of the counts in the counting gates may be used to determine the initial estimates of the parameters $A_B$, $B_F$, $\tau_B$, $\tau_F$ (or equivalently $\Sigma_B$, $\Sigma_F$). Where the dual burst technique as illustrated in FIG. 2 is used, the linear fit is preferably applied to the first two or three gates after the short burst 58 and is applied to the later two or three counting gates following the long burst.

As indicated in box 108 the mathematical model of one of the equations 16, 17, 18 or 19 (called here the "intrinsic sigma model") is fit to the data from box 104.

With the dual burst schedule of FIG. 2, a simultaneous fit of count rate data of all the gates following both the short burst 58 and the long burst 68 in the test formation may be applied to the intrinsic sigma model.

A wide variety of fitting techniques may be used, but a Non Linear Least Square (NLLSQ) program commercially available from IMSL, Inc. of Houston, Tex. is employed. The program is called IMSL. The parameters $\gamma_B$ and $\gamma_F$ in the models of equations 16, 17, 18 or 19 may simultaneously be fit to the count rate data along with $A_B$, $A_F$, $\tau_B$ and $\tau_F$. Alternatively, the relationship between $\gamma_B$ and $\tau_B$ and between $\gamma_F$ and $\tau_F$ may be determined from test formation measurements for which the parameters $\tau_B$ and $\tau_F$ are accurately known or some other measurable parameter, for example, near-far count rate ratio or amplitudes. In general $\gamma$ may be determined to be a function of a parameter, f(p), where p may be $\tau$, ratio of near to far detector count rates or ratio of near to far amplitudes.

A functional relationship between $\gamma_B$ and $\tau_B$ and $\gamma_F$ and $\tau_F$ may be established, that is, $\gamma_F = f_1(\tau_F, \tau_B)$ and $\gamma_B = f_2(\tau_B)$. The functional forms, $\gamma_F = f_1(\tau_F, \tau_B)$ and $\gamma_B = f_2(\tau_B)$ may be stored in tables and not treated as fitting parameters in the NLLSQ process for fitting the model $\tau_F$ and $\tau_B$. Equation 17 can be written as, $$N(t) = A_B t^{-f_2(\tau_B)} e^{-t/\tau_B} + A_F t^{-f_1(\tau_F, \tau_B)} e^{-t/\tau_F}. \quad (20)$$

Using equation 20 (or the equivalent model of equation 16) the fitting parameters are $\tau_B$, $A_B$, $\tau_F$ and $A_F$. When the data from gates following both the long burst 68 and short burst 58 are used, the NLLSQ fitting is applied to all gates covering both the short and long burst data.

The same procedure for data accumulated in the near detector 24 is performed on data accumulated in the far detector 26. Each decay constant is also transformed by a proportionality constant to obtain a correlative cross-section sigma, $\Sigma = 4545/\tau$. One or more of the variables $\tau_{Bn}$, $\Sigma_{Bf}$, $\Sigma_{Bn}$, and $\Sigma_{Bf}$, may be determined and recorded as a function of borehole depth on recorder 44 as illustrated in FIG. 1 where the subscript B represents borehole materials, n represents the near detector and f represents the far detector. Likewise, the variables $\tau_{Fn}$, $\tau_{Ff}$, $\Sigma_{Fn}$, and $\Sigma_{Ff}$, may be determined and recorded as a function of borehole depth where the subscript F represents the formation. Similarly, the neutron-gamma transport parameters $\gamma_{Bn}$, $\gamma_{Fn}$, $\gamma_{Bf}$, $\gamma_{Ff}$ may be determined and recorded on recorder 44.

An alternative method of determining $\tau_F$ is based on the assumption that gamma ray counts 70 following the long burst 68 as detected by the near detector 24 and the far detector 26 primarily result from formation thermal neutron decay. A preestablished relationship between the corrected formation tau, $\tau_{Fcorr}$ and near and far decay time constant measurements $\tau_{near,meas}$ and $\tau_{Ffar,meas}$ is stored in computer memory to obtain $\tau_{Fcorr}$. The preestablished relationship may be determined from test data taken from a test well. Such relationship may be established as a function of well parameters such as borehole diameter, casing size, etc.

Specifically, this alternative method fits a formation model of the form $$N(t)_{near} = A_{Fnear} t^{-\gamma_{Fnear}} e^{-t/\tau_{Fnear}}$$

to the "later" two or three (or more) gates for example, G5L, G6L, G7L, following the longer delay $D_L$ after the long burst 68 as detected by near detector 24. A model of the form $$N(t)_{far} = A_{Ffar} t^{-\gamma_{Ffar}} e^{-t/\tau_{Ffar}}$$

is fit to the count rate of "later" two or three gates G5L, G6L, G7L as detected by the far detector 26. As a result, real time values of $\tau_{Ffar}$ and $\tau_{Fnear}$ are obtained. A borehole corrected value of formation decay constant, Fcorr, is obtained by using a preestablished empirical relationship between $\tau_{Fcorr}$ and $\tau_{Fnear}$ and $\tau_{Ffar}$ as described in U.S. Pat. No. 4,445,033 to Preeg and Scott which is incorporated within this application for all purposes.

An alternative method to determine a corrected borehole decay time constant $\tau_{Bcorr}$ may be used by assuming that the gamma ray counts 60 following the short burst 58 (see FIG. 2) primarily result from borehole materials thermal neutron decay. For example, a "borehole" model of the form, $$N(t) = A_B t^{-\gamma_B} e^{-t/\tau_B}$$

is fit to the count rates of the gates primarily containing borehole thermal neutron information following the shorter delay $D_S$ after the short burst 58. Such gates may for example be G1S, G2S and G3S. A value of $\tau_B$(1 component) is obtained by one of the fitting techniques described above, where the designation "component" denotes that the borehole decay rate is obtained from data assumed to contain only borehole decay components.

A preestablished empirical relationship is formed between the $\tau_B$(1 component), determined according to the borehole model described above, and a decay rate, $\tau_B$(2 components), determined according to the methods described above where the full relationship, $$N(t) = A_B t^{-\gamma_B} e^{-t/\tau_B} + A_F t^{-\gamma_F} e^{-t/\tau_F},$$

is fit to data from known test formation measurements following the short burst and the long burst. Such relationship may be stored in a data table of memory of computer 42 as a function of parameters such as borehole sizes, casing sizes, etc. Ths, corrected decay rate for the borehole materials, $\tau_B$(2 components), obtained from the $\tau_B$(2 components)/$\tau_B$(1 component) preestablished parametric relationship may be determined from a computationally less complex real time determination of $\tau_B$(1 component). In a similar manner a corrected amplitude $A_B$ ($A_B$(2 components)) may be obtained from a computationally less complex determination of $A_B$(1 component) from the "borehole" model described above.

The amplitudes $A_B$ and $A_F$ of equation (13) may be interpreted as neutron slowing-down source densities when the decay and diffusion functions are properly normalized. Here, $$\frac{1}{\tau_B} \int_0^\infty dt\, F(t) e^{-t/\tau_B} = 1 \quad (21)$$

and $$\frac{1}{\tau_F} \int_0^\infty dt\, F(t) e^{-t/\tau_F} = 1 \quad (22)$$

for both near and far-spaced detectors. The impulse borehole and formation count rate amplitudes, $A_B$ and $A_F$ of equation (13) therefore represent the initial number of neutrons in the system from the thermalization source at t=0 from a delta function burst. The neutron thermalization time is small relative to the capture decay times. In the sense that the effects both of diffusion and capture have been removed, the amplitude, $A_B$ and $A_F$ represent epithermal neutron populations. The time distribution of the total number of neutrons is contained in the normalized $$F(t)\, e^{-t/\tau_B}$$

and $$H(t)\, e^{-t/\tau_F}$$

and the partition of counts between borehole and formation regions is set by the relative values of $A_B$ and $A_F$. The ratio of the formation amplitude from the near spaced detector, $A_{Fn}$, to that from the far spaced detector, $A_{Ff}$, is related to porosity of formation. Additionally, the ratio of the sum of the normalized borehole and formation amplitudes from the near spaced detector, $A_{Fn}+A_{Bn}$, to that from the far spaced detector, $A_{Ff}+A_{Bf}$, is also an indicator of porosity, that is, $$\phi = K \frac{A_{Fn}}{A_{Ff}}, \text{ or } \phi = K \frac{A_{Fn} - A_{Bn}}{A_{Ff} + A_{Bf}} \quad (23)$$

Where K is a transform function derived experimentaly from known formation and borehole conditions.

Therefore computer 42 according to the invention ratios the amplitude, applies a proportionality function K and records $\phi$ as illustrated in FIG. 1.

Figure 7:
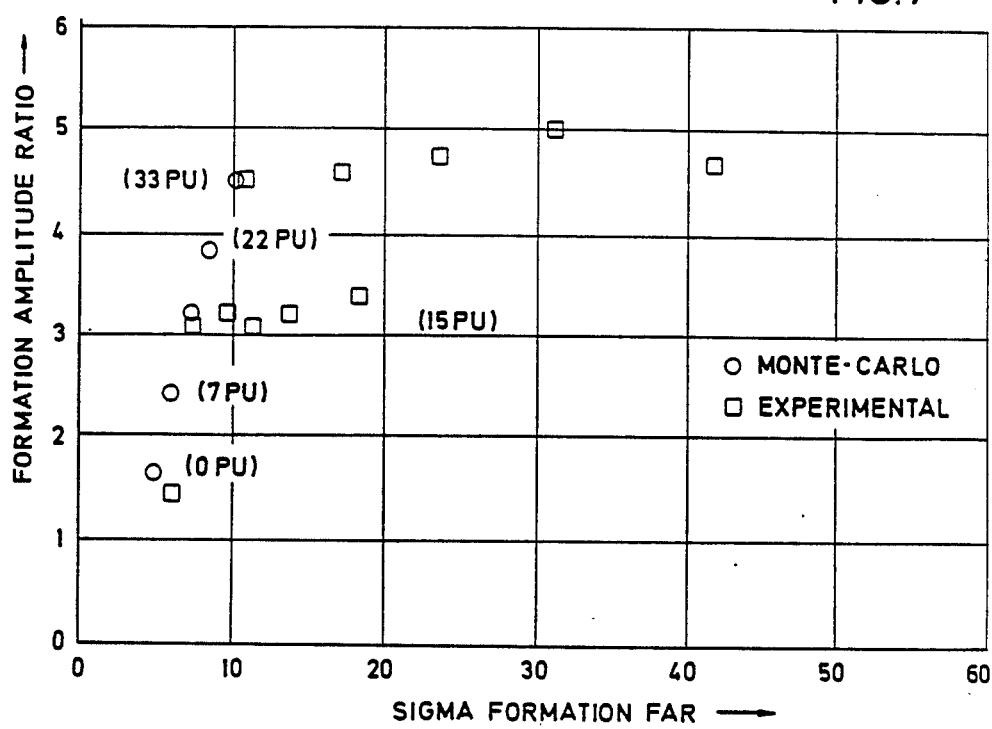
FIG. 7 shows the ratio of $A_{Fn}$ to $A_{Ff}$ plotted as a function of formation cross-section.

Illustrative of the formation amplitude ratio as an indicator of porosity, FIG. 7 shows the ratio plotted against the formation cross-section sigma as measured from the far detector. The various porosities are identified with rows of points. Also shown in FIG. 7 are results from Monte-Carlo modeling of the tool's response in intermediate porosity formations and for porosities of test formations of 0, 15 and 33 porosity units. Although the detailed behavior of the curves is dependent on paraeter estimates computed by lease squares fitting to the data, it is evident that the ratio is not strongly dependent on thermal absorption as measured by the sigma of the formation.

Figure 8:
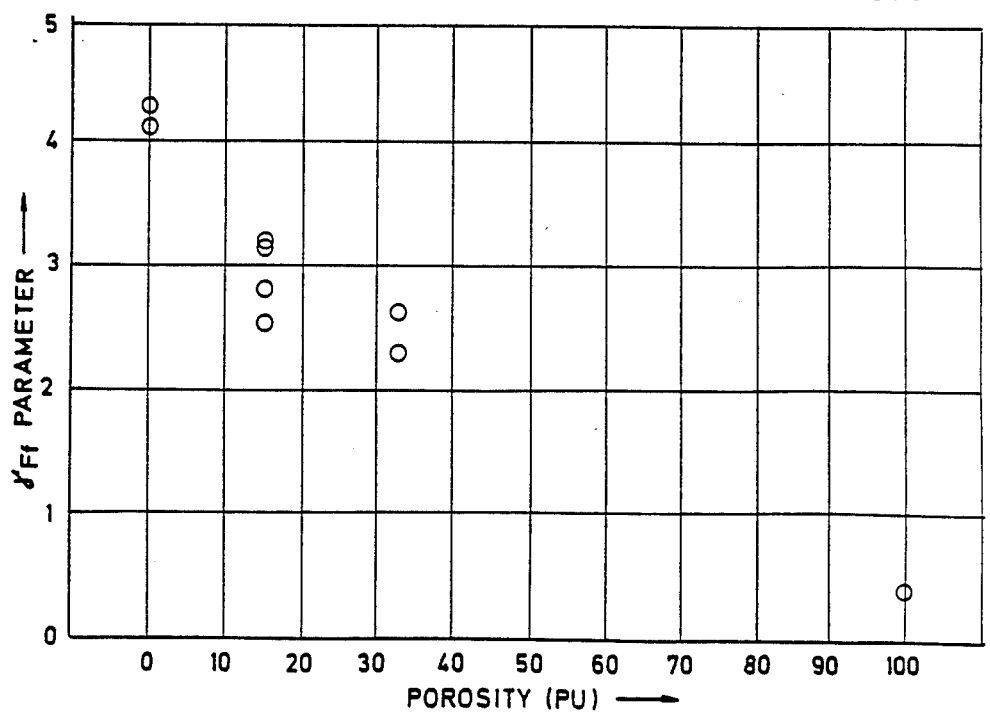
FIG. 8 shows the neutron gamma parameter $\gamma_F$ plotted as a function of formation porosity.

Porosity, through the hydrogen index, strongly influences thermal neutron diffusion. Where hydrogen concentration is large, the thermal neutron cloud remains spatially localized in time, whereas at low hydrogen concentration, the cloud can spread out further. FIG. 8 shows $\gamma_{Ff}$, the neutron-gamma transport parameter as measured from the far detector, plotted as a function of formation porosity. The results show decreasing diffusion influence as porosity increases. It is apparent, therefore that $\gamma_{Ff}$ (or $\gamma_{Fn}$) may be used as a measure of the porosity of the formation.

Various modifications and alterations in the described structures and methods will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. A borehole logging method for determining a characteristic representative of porosity of a formation surrounding the borehole, comprising the steps of:
   (a) irradiating said formation surrounding the borehole from a location within the borehole with a burst of neutrons,
   (b) detecting at a near detector indications of the concentration of the diffused thermal neutrons following said burst of neutrons and generating near count rate signals as a function of time in response thereto,
   (c) detecting at a far detector indications of the concentration of the diffused thermal neutrons following said burst of neutrons and generating far count rate signals as a function of time in response thereto,
   (d) subjecting said near count rate signals to a filtering process to generate a near impulse count rate amplitude having a reduced dependency on the effects of diffusion,
   (e) subjecting said far count rate signals to a filtering process to generate a far impulse count rate amplitude having a reduced dependency on the effects of diffusion; and
   (f) determining the ratio of near to far count rate amplitudes as a characteristic proportional to the porosity of the formation.

2. The method according to claim 1 further comprising the step of repeating steps (a) to (f) and recording said porosity characteristic as a function of borehole depth.

3. The method of claim 1 wherein in step (d) the near impulse formation count rate amplitude, $A_{Fn}$ is generated, and in step (e) the far impulse formation count rate amplitude $A_{Ff}$ is generated.

4. The method of claim 1 wherein in step (d) the near impulse formation and borehole count rate amplitude, $A_{Fn}+A_{Bn}$ is generated and in step (e) the far impulse formation and borehole count rate amplitude $A_{Ff}+A_{Bf}$ is generated.

5. The method according to claim 1 wherein said filtering process includes the fitting of a count rate model of the form:

$$A_F F(t)\, e^{-t/\tau_F},$$

to said count rate signals, where t is the time, A is count rate amplitude, $\tau_F$ is the rate of decay of thermal neutrons of said formation an F(t) is a time dependent function describing the diffusion effect.

6. The method according to claim 5 wherein said time dependent function F(t) is of the form:

$$t^{-\gamma_F},$$

where $\gamma F$ is a neutron-gamma transport parameter.

7. The method of any of claims 1, 3 or 5 further comprising the step of detecting background radiation and wherein following said step (c), the indications of the concentration of the near and far thermal neutrons are compensated for background radiation before proceeding with steps (d) and (e).

8. The method according to claim 1 further comprising the step of calculating the ratio of the impulse formation count rate amplitudes from respectively the near detector and the far detector, said ratio being representative of the porosity of the formation.

9. The method according to claim 1 further comprising the step of calculating the ratio of the sum of the impulse bore hole count rates amplitudes from respectively the near detector and the far detector, to the sum of the impulse formation count rate amplitudes from the near and far detector, said ratio being representative of the porosity of the formation.

10. A borehole logging method for determining a characteristic representative of porosity of a formation surrounding the borehole, comprising the steps of:
   irradiating said formation surrounding the borehole from a location within the borehole with a burst of neutrons,
   detecting indications of the concentration of thermal neutrons following said burst of neutrons and generating count rate signals as a function of time in response thereto,
   determining $\gamma_F$ by fitting a function of the form, $$A_F t^{-\gamma F} e^{-t/96\,F}$$

to said count rate signals,
   where $\gamma_F$ is a neutron-gamma transport parameter and $\tau_F$ is the rate of decay of thermal neutrons in said formation, t is time and $A_F$ is count rate amplitude,
   determining a numerical estimate of porosity of said formation from a pre determined estimate of the relationship between $\gamma_F$ and porosity, and
   repeating the steps above at a different location within the borehole and recording said estimate of porosity as a function of borehole depth.

11. A borehole logging apparatus for determining a characteristic representative of porosity of a formation surrounding the borehole, comprising:
   (a) means for irradiating said formation surrounding the borehole from a location within the borehole with a burst of neutrons,
   (b) mans for detecting at a near detector indications of the concentration of thermal neutrons following said burst of neutrons and generating near count rate signals as a function of time in response thereto,
   (c) means for detecting at a far detector indications of the concentration of thermal neutrons following said burst of neutrons and generating far count rate signals as a function of time in response thereto,
   (d) means for fitting a count rate mode to said near count rate signals to determine a near impulse count rate amplitude,
   (e) means for fitting a count rate model including diffusion factor to said far count rate signals to determine a far impulse count rate amplitude; and
   (f) means for determining the ratio of near to far count rate amplitudes as a characteristic proportional to the porosity of the formation.

12. The apparatus according to claim 11 further comprising means for repeating steps (a) to (f) and means for recording said porosity characteristic as a function of borehole depth.

13. The borehole logging apparatus of claim 11 further comprising means for controlling the width of said burst to generate respective short bursts and order of manufacturing longer bursts.

14. The borehole logging apparatus of claims 11 or 13 further comprising means for detecting background radiation and means for compensating said respective near and far count rate signals for the effects of said background radiation.

15. The borehole logging apparatus of claim 11 wherein said means for fitting a count role model to said near count rate signals further comprises a count rate model including diffusion factor.

16. The apparatus according to claim 15 wherein said means for fitting a count rate model to said near count rate signals, and means for fitting a count rate model to said for count rate signals, include respective means for filter in said respective ne ar and far count rate signals according to the following formula:

$$A_F t^{-\gamma F} e^{-t/\tau F}$$

17. The apparatus according to claim 11 further comprising means for calculating the ratio of the impulse formation count rate amplitudes from respectively the near detector an the far detector, said ratio being representative of the porosity of the formation.

18. The apparatus according to claim 11 further comprising means for calculating the ratio of the sum of the impulse bore hole count rates amplitudes from respectively the near detector and the far detector, to the sum of the impulse formation count rate amplitudes from the near an far detector, said ratio being representative of the porosity of the formation.

19. A borehole logging apparatus for determining a characteristic representative of porosity of a formation surrounding the borehole, comprising:
   means for irradiating said formation surrounding the borehole from a location within the borehole with a burst of neutrons,
   mans for detectind indications of the concentration of thermal neutrons following said burst of neutrons and generating count rate signals as a function of time in response thereto,
   means for fitting a function of the form, $$A_F F(t) e^{-t/96\,F},$$

to said count rate signals, where F(t) is a time dependent function, describing the diffusion effect of formal neutrons, $\tau_F$ is the rate of decay of thermal neutrons in said formation, t is time, and Af is count rate amplitudes, and
   means or repeating the steps above at a different location within the bore hole and recording said estimate of porosity as a function of borehole depth.

20. The apparatus according to claim 19 wherein said time dependent function F(t) is of the form:
   $t - \gamma F$, were $\gamma F$ is a neutron-gamma transport parameter, and wherein it further comprises
   means for determining a numerical estimate of porosity of said formation from a predetermined estimate of the relationship between F and porosity.

* * * * *